UNITED STATES PATENT OFFICE.

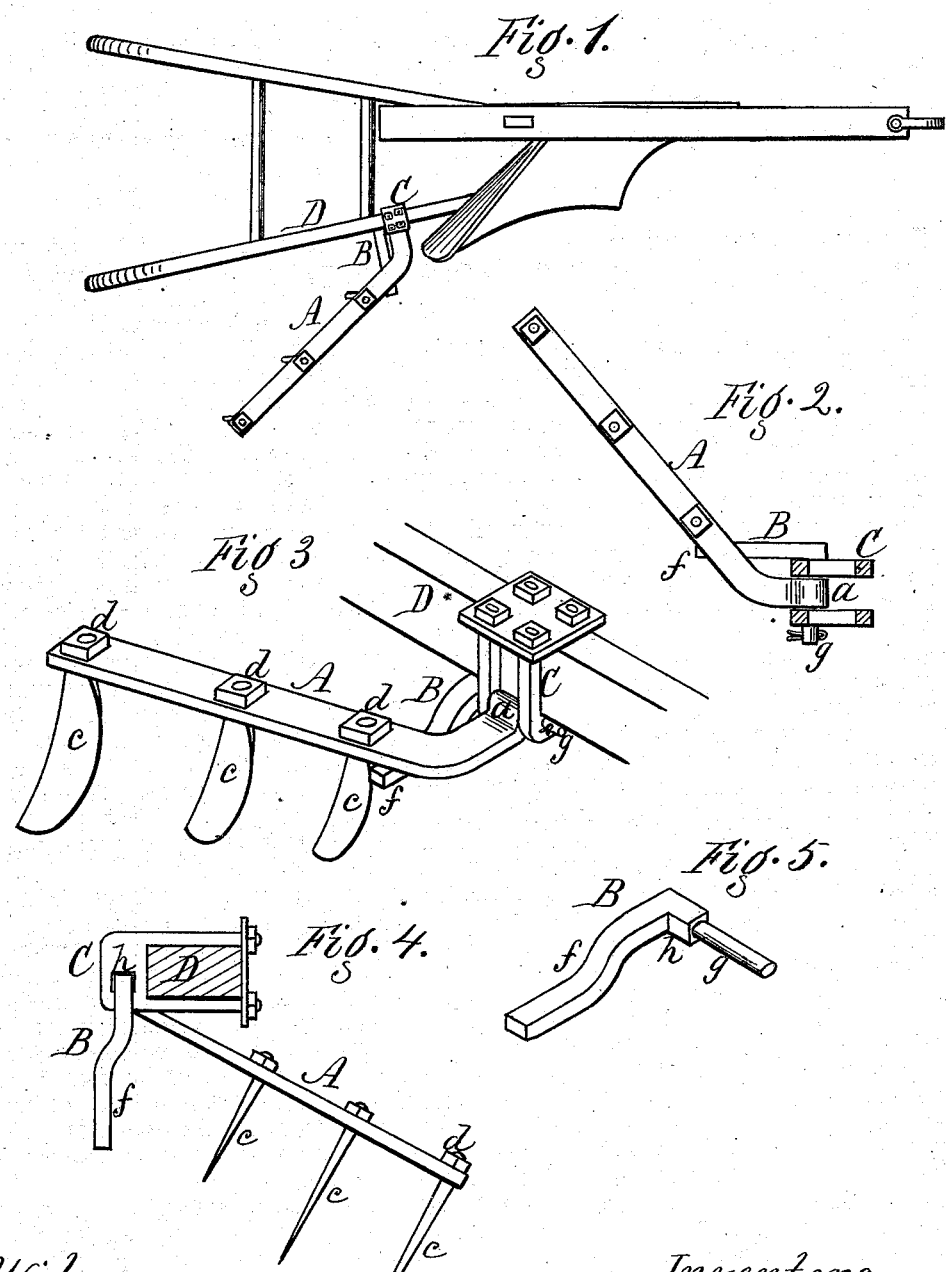

PIERSON JACOBUS AND DAVID R. AMBROSE, OF ROMULUS, NEW YORK.

IMPROVEMENT IN HARROW ATTACHMENTS FOR PLOWS.

Specification forming part of Letters Patent No. 159,416, dated February 2, 1875; application filed November 2, 1874.

*To all whom it may concern:*

Be it known that we, PIERSON JACOBUS and DAVID R. AMBROSE, both of Romulus, in the county of Seneca and State of New York, have invented a certain new and useful Improvement in Harrow Attachments for Plows; and we do hereby declare that the following is a full, clear, and exact description of the construction and operation of the same, reference being had to the accompanying drawings, in which—

Figure 1 is a plan of a plow provided with our improvement. Fig. 2 is a plan of the attachment, with the clip in section. Fig. 3 is a perspective view of the attachment. Fig. 4 is a view showing the position of the attachment when the plow is turned on its wing in passing corners. Fig. 5 is a perspective view of the key-stop.

This improvement relates to harrow attachments for cutting and pulverizing the furrows as fast as they are turned by the plow. Various devices for this purpose are already known, and therefore we do not claim, broadly, a harrow attachment to a plow; but our invention consists of a harrow attachment to a plow, consisting of a backwardly-curved hinge-bar and key-stop, in combination with a clamp and handle, operating as will be hereinafter more fully set forth.

In the drawings, A represents the arm, and B the key-stop. The arm consists of a curved bar, which stands outward and backward in an angular direction from the plow-beam, and has at the inner end an eye, $a$, which is pivoted in a clip, C, attached to the plow-handle D. The clip may be single or double, but it has a slot or fork in its lower end, which receives the eye $a$, and thereby allows the arm to turn vertically. At the outer end of the arm are a series of vertical teeth, $c\ c\ c$, with sharp cutting-edges standing forward to cut into the furrow. They may be made either straight or curved; but the outer teeth are the longest and graduate inward, so as to cut evenly at the incline to which they are set. In action they stand inclined, the lower ends standing backward, as shown in Figs. 1 and 3. These teeth are so connected with the arm as to be adjusted axially, thereby changing the angle of cut according to the kind or condition of the soil. We prefer to attach them by nuts $d\ d\ d$. Sharp-edged disks might be used with the same result.

The key-stop is in the form of an elbow, and consists of two right angled arms, $f\ g$, as shown in Fig. 5. The arm $g$ serves as a pivot, which secures the eye $a$ to the clip. The arm $f$ forms the stop proper, and projects out laterally, so as to rest under the arm A when working. In order to retain its position as a stop or gage to the cutting attachment the key-stop has a square shoulder, $h$, (Figs. 4 and 5,) which rests in a corresponding square socket of the clip. By this means it keeps its stiff position to hold the arm A, while the round part acts as a pivot.

This stop prevents the attachment from cutting too deep, or from falling below the horizontal line, as it would do if there were nothing to prevent. It holds it up at all times in working order, yet, when the plow turns on the wing, no resistance is offered by the stop.

If desired, a horizontal hinge may also be employed, and a spring may extend from the handle to the harrow attachment.

By the arrangement above described the arm A is free to rise if it meets any obstruction, such as a stone or root, and thereby pass over it, and as soon as it is over it falls to place again of its own accord, and the key-stop prevents it from falling too low, and thereby gages the depth of cut. It also acts as the key or pivot to connect the arm with the clip.

This arrangement is of particular advantage in turning corners at the ends of furrows, as the wing of the plow can turn over and drag in the ordinary way upon the ground, the arm simply following in the rear and lying flat at the proper position, and presenting no impediment to the motion of the plow. This action is shown more particularly in Fig. 4.

Having thus described our invention, we do not claim, broadly, a harrow attachment to a plow; but

We claim as new—

The harrow attachment to a plow, consisting of the backwardly-curved hinged bar A and key-stop B, in combination with the clamp C and handle D, all constructed as herein shown and described.

In witness whereof we have hereunto signed our names in the presence of two subscribing witnesses.

PIERSON JACOBUS.
DAVID R. AMBROSE.

Witnesses:
JAMES WOODRUFF,
JOHN M. DAY.